(12) United States Patent
Fitzsimmons

(10) Patent No.: US 7,127,976 B1
(45) Date of Patent: Oct. 31, 2006

(54) GUIDE FOR A CUTTING TOOL

(76) Inventor: George Fitzsimmons, 504 Virginia Ave., Louisville, KY (US) 40222

( * ) Notice: Subject to any disclaimer, the term of this patent is extended or adjusted under 35 U.S.C. 154(b) by 23 days.

(21) Appl. No.: 11/158,473

(22) Filed: Jun. 22, 2005

Related U.S. Application Data

(60) Provisional application No. 60/582,105, filed on Jun. 23, 2004.

(51) Int. Cl.
B23D 47/04 (2006.01)
B23D 55/04 (2006.01)

(52) U.S. Cl. ............... 83/435.11; 83/437.1; 83/438; 83/477.2; 144/204.2; 144/253.1; 144/286.1; 409/159

(58) Field of Classification Search .......... 83/435.11, 83/435.12, 437.1, 438, 477.2; 144/253.1, 144/253.5, 253.6, 144.1, 286.1, 204.2; 409/145, 409/159, 172; 408/69–70, 103, 108
See application file for complete search history.

(56) References Cited

U.S. PATENT DOCUMENTS

| | | | |
|---|---|---|---|
| 1,651,846 A | | 12/1927 | Stauder |
| 1,831,124 A | * | 11/1931 | Koster ................. 83/435.12 |
| 2,085,236 A | * | 6/1937 | Tautz ................. 144/204.2 |
| 2,522,965 A | * | 9/1950 | Schaufelberger ......... 83/435.27 |
| 2,739,625 A | | 3/1956 | Peters |
| 2,895,513 A | * | 7/1959 | Cowley ............... 83/435.11 |
| 4,026,173 A | | 5/1977 | Livick |
| 4,603,612 A | | 8/1986 | Atkins |
| 4,732,182 A | | 3/1988 | Gorsha |
| 5,018,562 A | | 5/1991 | Adams |
| 5,176,058 A | * | 1/1993 | Skelly ................. 83/435.12 |
| 5,205,198 A | | 4/1993 | Foray et al. |
| 5,617,909 A | * | 4/1997 | Duginske ............... 144/253.5 |
| 5,662,019 A | | 9/1997 | Denman |
| 5,768,966 A | * | 6/1998 | Duginske ............... 144/253.1 |
| 5,890,524 A | * | 4/1999 | Tucker et al. .......... 144/371 |
| 5,979,283 A | | 11/1999 | Osborne |
| 6,164,176 A | * | 12/2000 | Larsson ............... 83/435.12 |
| 7,077,043 B1 | * | 7/2006 | Koerble et al. ......... 144/204.2 |

FOREIGN PATENT DOCUMENTS

EP 154311 A2 * 9/1985

* cited by examiner

*Primary Examiner*—Erica Cadugan
(74) *Attorney, Agent, or Firm*—Stites & Harbison, PLLC; David W. Nagle, Jr.

(57) ABSTRACT

A guide comprises one or more brackets for securing the guide to a cutting tool, a horizontal support member secured to and moveable with respect to the brackets, and one or more arm assemblies secured to the horizontal support member and adapted to secure a working piece relative to the horizontal support member. With the working piece secured to the guide in this manner, the working piece may be readily advanced over a blade of the cutting tool by grasping and moving the horizontal support member relative to the brackets, thus ensuring a precise cutting of the working piece while also allowing a user to keep their hands away from the blade.

16 Claims, 8 Drawing Sheets

GUIDE FOR A CUTTING TOOL

CROSS-REFERENCE TO RELATED APPLICATIONS

The present application claims priority to U.S. Provisional Patent Application Ser. No. 60/582,105 filed on Jun. 23, 2004, the entire disclosure of which is incorporated herein by reference.

BACKGROUND OF THE INVENTION

The present invention relates to a cutting tool, and, more particularly, to a guide that can be secured to the fence of the cutting tool to facilitate a cutting or similar operation on a working piece, while also allowing a user to keep their hands away from the cutting blade.

As woodworkers and other craftsman know, it is often difficult to ensure a precise cut when working with large or cumbersome boards, logs, or other working pieces on a table saw, band saw, or similar cutting tool. Furthermore there are safety issues, since the user should obviously maintain a safe distance away from the cutting blade, which may prove problematic if the user has to continually manipulate the working piece relative to the cutting blade.

There is therefore a need for a guide for a cutting tool that facilitates a cutting or similar operation on a working piece, while also allowing a user to keep their hands away from the cutting blade.

SUMMARY OF THE INVENTION

The present invention is a guide for a cutting tool that can be secured to the fence of the cutting tool and facilitates a cutting or similar operation on a working piece, while also allowing a user to keep their hands away from the cutting blade.

A guide for a cutting tool made in accordance with the present includes a horizontal support member. Mounted to one side of the horizontal support member are one or more brackets, which allow the horizontal support member to be secured to the fence of the cutting tool, such as a table saw or band saw, with each bracket being movable relative to and along the length of the horizontal support member. Accordingly, once the brackets have been secured to the fence of the cutting tool, the horizontal support member can be moved in a forward or rearward direction relative to the brackets, and thus, the cutting tool.

One or more arm assemblies are also secured to the horizontal support, each at a predetermined location along the length of the horizontal support member. These arm assemblies are then used to secure a working piece (i.e., a piece of wood or other material) relative to the horizontal support member. With the working piece secured to the guide in this manner, the working piece may be readily advanced over a blade of the cutting tool by grasping and moving the horizontal support member relative to the brackets, thus ensuring a precise cutting of the working piece while also allowing a user to keep their hands away from the blade.

DETAILED DESCRIPTION OF THE INVENTION

The present invention is a guide for a cutting tool that can be secured to the fence of the cutting tool and facilitates a cutting or similar operation on a working piece, while also allowing a user to keep their hands away from the cutting blade.

Figure 1:
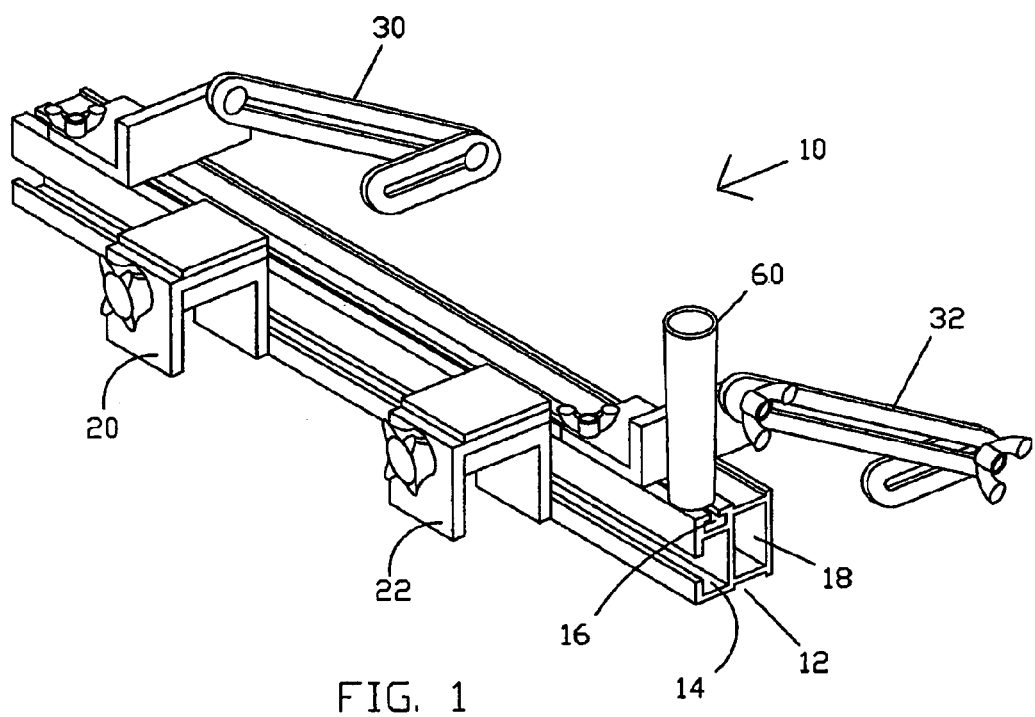
FIG. 1 is a perspective view of an exemplary guide for a cutting tool made in accordance with the present invention.
Figure 2:
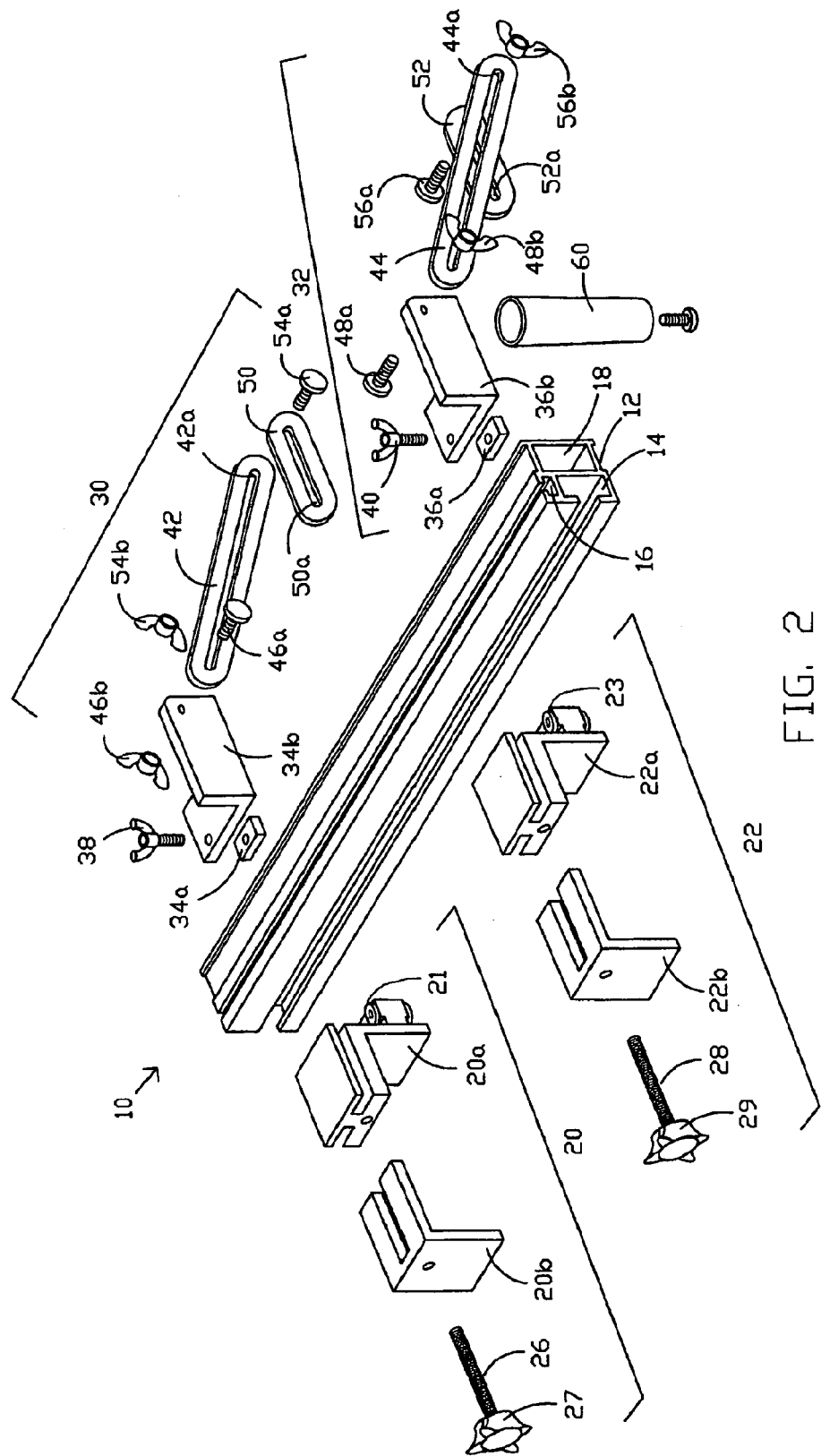
FIG. 2 is an exploded perspective view of the exemplary guide of FIG. 1.

FIGS. 1 and 2 are perspective and exploded perspective views of an exemplary guide 10 for a cutting tool made in accordance with the present invention. As illustrated in FIGS. 1 and 2, the guide 10 includes a horizontal support member 12 that, in this embodiment, includes three discreet channels 14, 16, 18. Mounted to one side of the horizontal support member 12 is a pair of brackets 20, 22, which allow the horizontal support member 12 to be secured to the fence of a cutting tool, such as a table saw or band saw. Specifically, each bracket 20, 22 includes a first portion 20a, 22a that has one or more bearings (generally indicated by reference numerals 21 and 23) on a surface thereof. These bearings 21, 23 are received in one of the channels 14 of the horizontal support member 12, such that each bracket 20, 22 is movable relative to the horizontal support member 12. Each bracket 20, 22 further includes a second portion 20b, 22b that is adjustably secured to the first portion 20a, 22a, thus creating a clamp that can be secured to the fence of a cutting tool, as will be further described below.

In this exemplary embodiment, the adjustment of the relative positioning of the bracket portions is accomplished by the turning of a screw 26, 28 that passes through the respective bracket portions 20a, 20b, 22a, 22b. This is preferably accomplished by rotating a knob 27, 29 secured to a distal end of each screw 26, 28. In this regard, each screw 26, 28 passes through a hole defined by the respective second bracket portion 20b, 22b and into a corresponding threaded hole defined by the respective first bracket portion 20a, 22a. Furthermore, it should be recognized that in this exemplary embodiment, the respective first bracket portions 20a, 22a each include integral channels that receive corresponding integral projections of the respective second bracket portions 20b, 22b such that there is a slidable movement of the bracket portions 20a, 20b, 22a, 22b with respect to one another. Accordingly, as each knob 27, 29 is rotated and the respective screw 26, 28 turned, the respective second bracket portion 20b, 22b is advanced toward the first bracket portion 20a, 22a, thus "closing" the clamp created therebetween.

Figure 4:
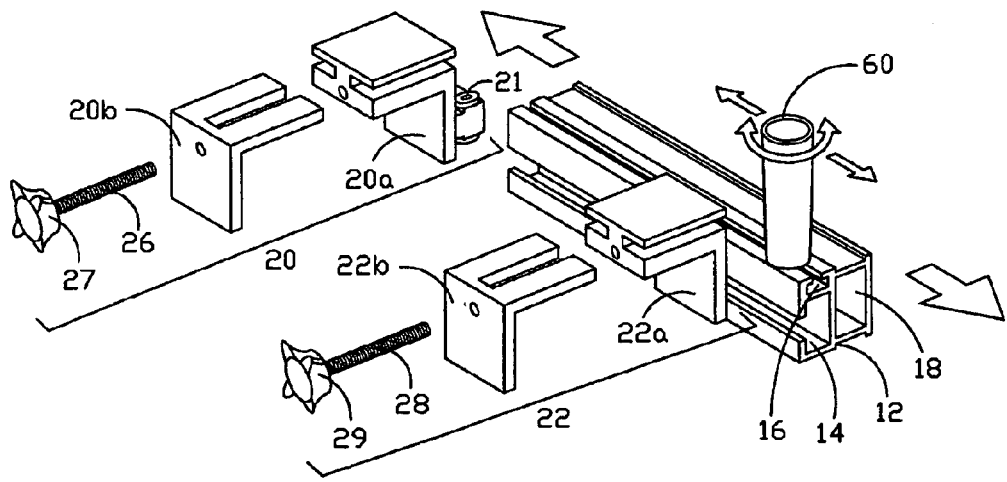
FIG. 4 is an exploded perspective view of the brackets of the exemplary guide of FIG. 1 that secure the horizontal support member to the fence of the cutting tool.
Figure 4A:
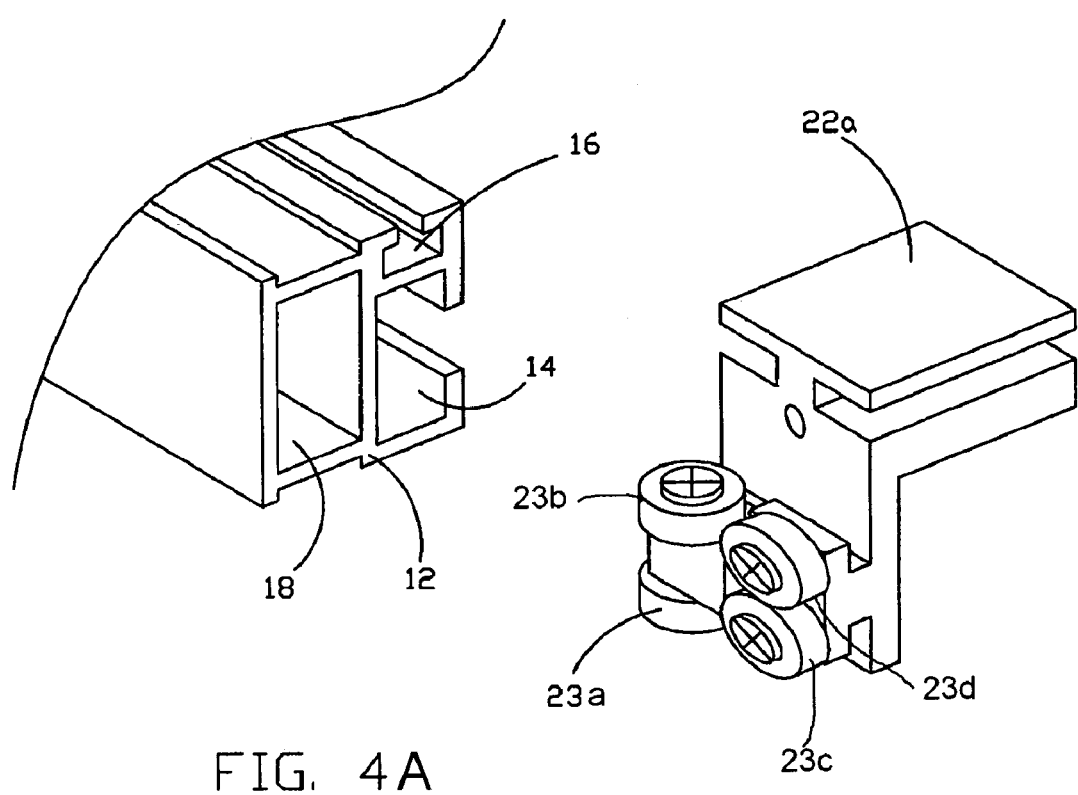
FIG. 4A is an alternate perspective view of one of the bracket portions of the exemplary guide of FIG. 1, illustrating the relative positioning of the bearings.

In any event, once the brackets 20, 22 have been secured to the fence of the cutting tool, the horizontal support member 12 can be moved in a forward or rearward direction relative to the brackets 20, 22, with the bearings 21, 23 rolling along a track defined by the channel 14. FIG. 4 is an exploded perspective view of the brackets 20, 22 of the exemplary guide 10, further illustrating their attachment to the horizontal support member 12, and FIG. 4A is an alternate perspective view of one of the bracket portions 22. As illustrated, in this exemplary embodiment, the bearings are wheel bearings positioned so as to engage the wall surfaces of the channel 14. Specifically, there are two wheel bearings 23a, 23b that rotate about a substantially vertical axis for engaging the floor and ceiling surfaces of the channel 14, and two wheel bearings 23c, 23d that rotate about a substantially horizontal axis for engaging the side wall surfaces of the channel 14. However, various bearings could be used without departing from the spirit and scope of the present invention, provided that the horizontal support member 12 can be moved in a forward or rearward direction relative to the brackets 20, 22.

A second channel 16 of the horizontal support member 12 is designed to receive and retain a pair of arm assemblies 30, 32, which then secure a working piece (i.e., a piece of wood or other material) relative to the horizontal support member 12. In this exemplary embodiment, each arm assembly 30, 32 has a first base portion 34a, 36a that is actually received in the channel 16 and a second base portion 34b, 36b that rests on the upper surface of the horizontal support member 12. By passing a screw 38, 40 through the respective base portions, each arm assembly 30, 32 can be secured to the horizontal support member 12 at an appropriate location along the length of the support member 12.

In this exemplary embodiment, extending from the second base portion 34b, 36b of each arm assembly 30, 32 is a first arm segment 42, 44, which is secured to the second base portion 34b, 36b by a screw and wing nut combination 46a, 46b, 48a, 48b. In this regard, the first arm segments 42, 44 each define a central elongated opening or slot 42a, 44a, allowing the screws 46a, 48a to be passed through each arm segment 40, 42, and then through a corresponding opening defined through each second base portion 34b, 36b, with the respective wing nuts 46b, 48b then completing the assembly. Of course, through such an assembly, the position and angular orientation of each first arm segment 40, 42 relative to the respective second base portion 34b, 36b can be readily adjusted.

A second arm segment 50, 52 is then secured to the first arm segment 42, 44 by another screw and wing nut combination 54a, 54b, 56a, 56b, again with the screws 54a, 56a passing through the central elongated opening or slot 42a, 44a defined by the respective first arm segments. Through such an assembly, the position and angular orientation of each second arm segment 50, 52 relative to the respective first arm segment 40, 42 can be readily adjusted. In other words, in this exemplary embodiment, the arm assemblies can be characterized as "articulating" arm assemblies as they are comprised of multiple discrete segments united at joints.

In any event, a working piece can then be secured between the second arm segments 50, 52, as is further described below.

Figure 3:
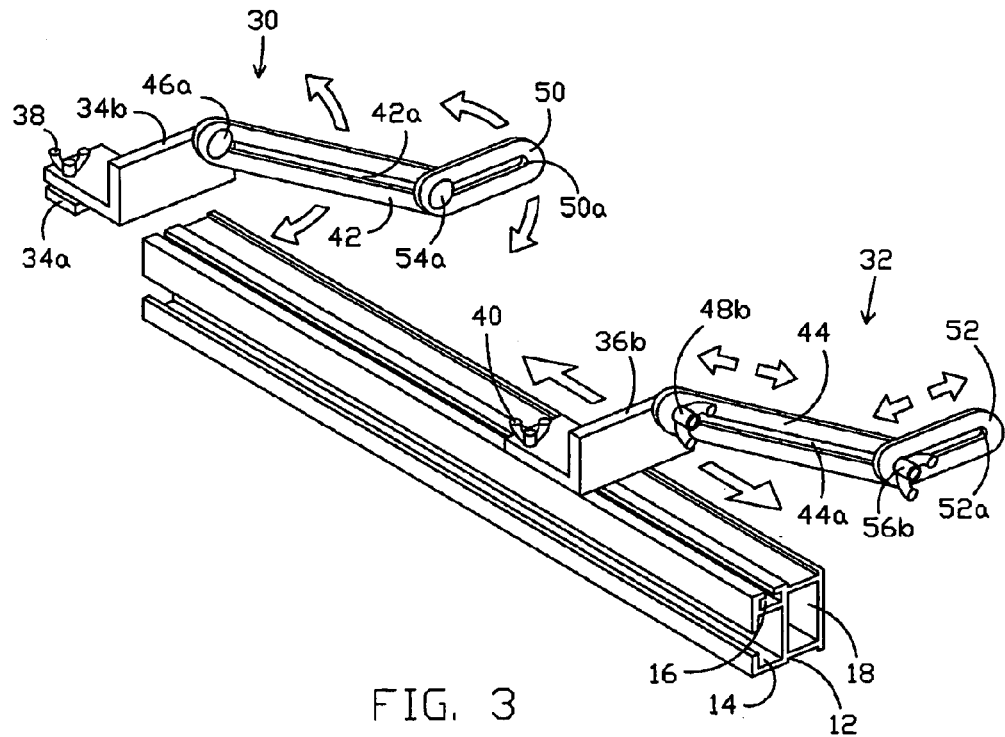
FIG. 3 is a perspective view of the horizontal support member and arm assemblies of the exemplary guide of FIG. 1.

FIG. 3 is another perspective view of the horizontal support member 12, illustrating the attachment of the articulating arm assemblies 30, 32, and further illustrating how the components of these arm assemblies 30, 32 can be manipulated and moved with respect to one another. Specifically, as illustrated by the arrows in FIG. 3, the arm segments 42, 44, 52, 54 can be pivoted and adjusted to an appropriate position for securing a working piece.

Finally, with respect to the second channel 16 of the horizontal support member 12, and as illustrated in FIGS. 1 and 4, it may also facilitate the attachment of a handle 60, the importance of which will become clearer below.

Figure 5:
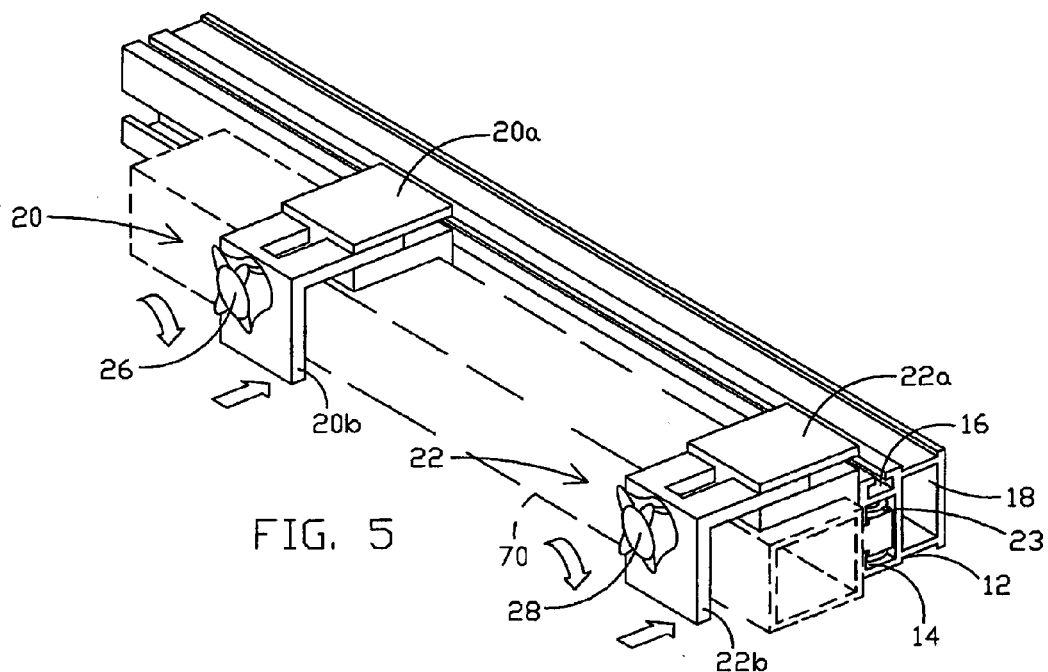
FIG. 5 is a perspective view of the exemplary guide of FIG. 1 attached to a fence (shown in phantom) of a cutting tool.

FIG. 5 is a perspective view of the exemplary guide 10 attached to a fence 70 of a cutting tool, but without the above-described pair of articulating arm assemblies 30, 32. Perhaps more illustrative of the manner in which the guide 10 of the present invention is used, FIG. 7 is a perspective view of the guide 10 of the present invention being used with a table saw 80, and FIG. 8 is a perspective view of the guide 10 being used with a band saw 100.

Figure 7:
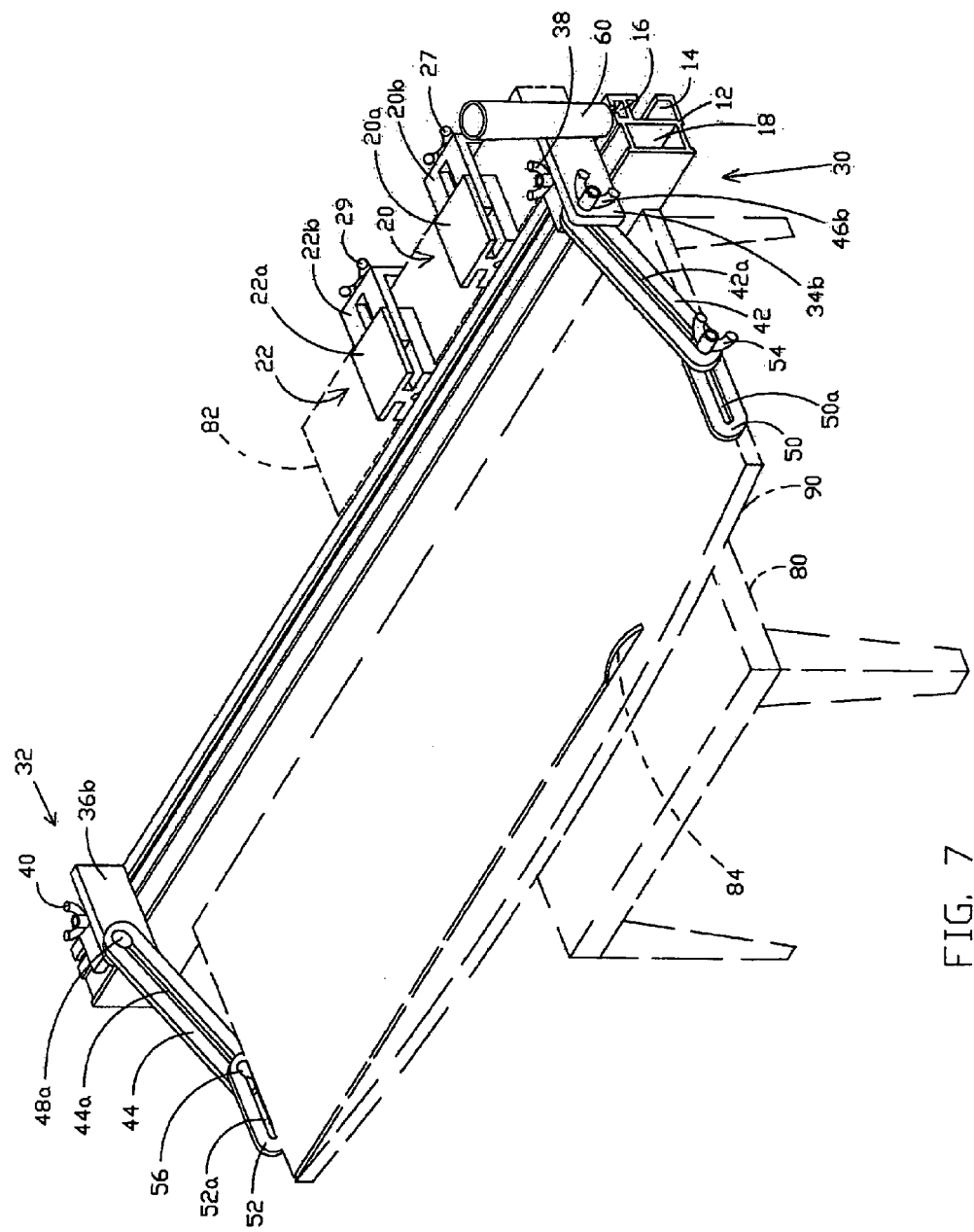
FIG. 7 is a perspective view of the exemplary guide of FIG. 1 being used with a table saw.

Referring first to FIG. 7, the brackets 20, 22 of the guide 10 are secured to the fence 82 of the table saw 80. The articulating arm assemblies 30, 32 are then used to secure a working piece 90 (i.e., a board) relative to horizontal support member 12 of the guide 10. In this regard, it can be seen that the respective second arm segments 50, 52 of the articulating arm assemblies 30, 32 each also have an elongated central channel or slot 50a, 52a, such that a screw or similar fastener (not shown) can be passed through the channel or slot 50a, 52a and into the working piece 90 to secure the working piece 90 relative to the articulating arm assemblies 30, 32. With the working piece 90 secured to the guide 10 in this manner, the working piece 90 may be readily advanced over the cutting blade 84 of the table saw 80 simply by grasping and moving the horizontal support member 12 relative to the brackets 20, 22, with the bearings 21, 23 rolling along a track defined by the channel 14. This ensures a precise cutting of the working piece 90, while also allowing a user to keep their hands away from the cutting blade 84.

Figure 8:
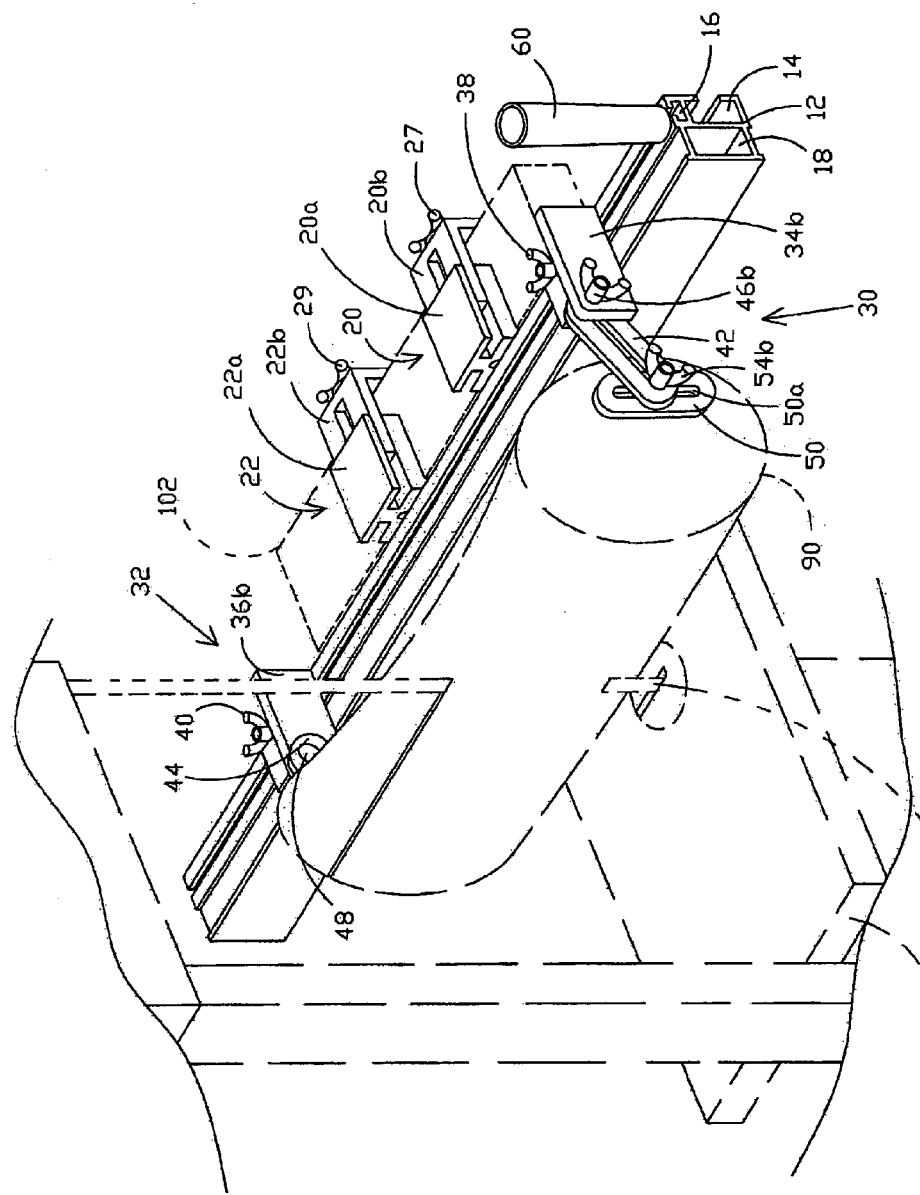
FIG. 8 is a perspective view of the exemplary guide of FIG. 1 being used with a band saw.

Referring now to FIG. 8, the brackets 20, 22 of the guide 10 are secured to the fence 102 of the band saw 100. The articulating arm assemblies 30, 32 are then used to secure a working piece 90 (i.e., a log) relative to horizontal support member 12 of the guide 10. Again, it can be seen that the respective second arm segments 50, 52 of the articulating arm assemblies 30, 32 each have an elongated central channel or slot 50a, 52a, such that a screw or similar fastener (not shown) can be passed through the central channel or slot 50a, 52a into the working piece 90 to secure the working piece 90 relative to the articulating arm assemblies 30, 32. With the working piece 90 secured to the guide 10 in this manner, the working piece 90 may be readily advanced over the cutting blade 104 of the band saw 100, again by grasping and moving the horizontal support member 12 relative to the brackets 20, 22, with the bearings 21, 23 rolling along a track defined by the channel 14. Similar to the use of the guide 10 with the table saw 80 as described above with respect to FIG. 7, this ensures a precise cutting of the working piece 90, while also allowing a user to keep their hands away from the cutting blade 104.

Figure 6:
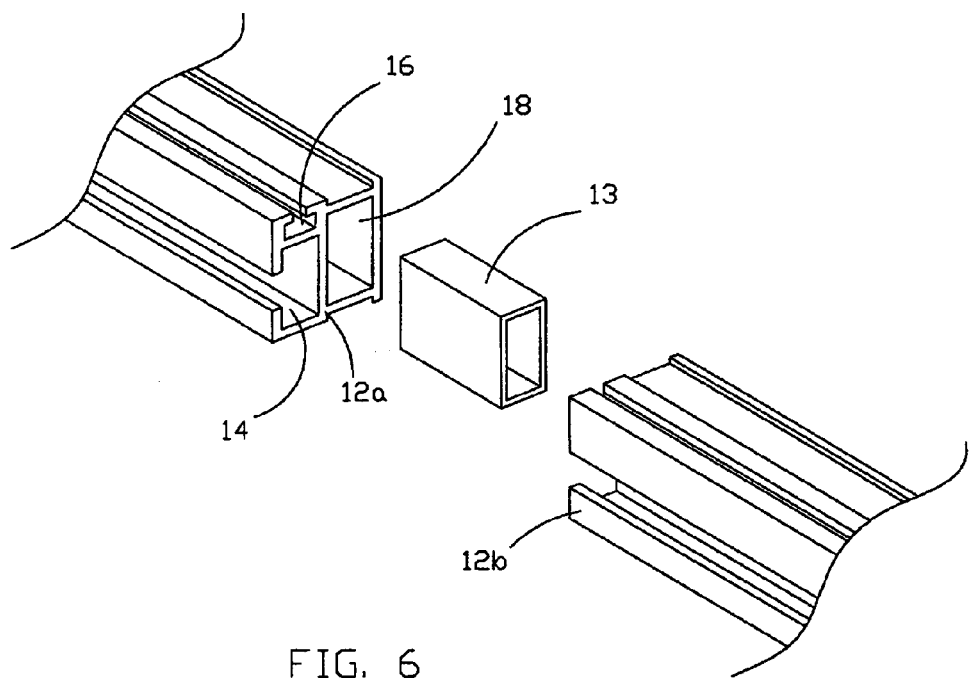
FIG. 6 is a perspective view of a connector that allows two segments of the horizontal support member to be connected to one another.

It should be recognized that because of the construction of the horizontal support member 12 of the guide 10, the length of the horizontal support member 12 can be readily extended. As illustrated in FIG. 6, two segments 12a, 12b of the support member can be joined together by a connector 13 that is received in the respective channels 18 defined by the segments 12a, 12b.

Figure 9:
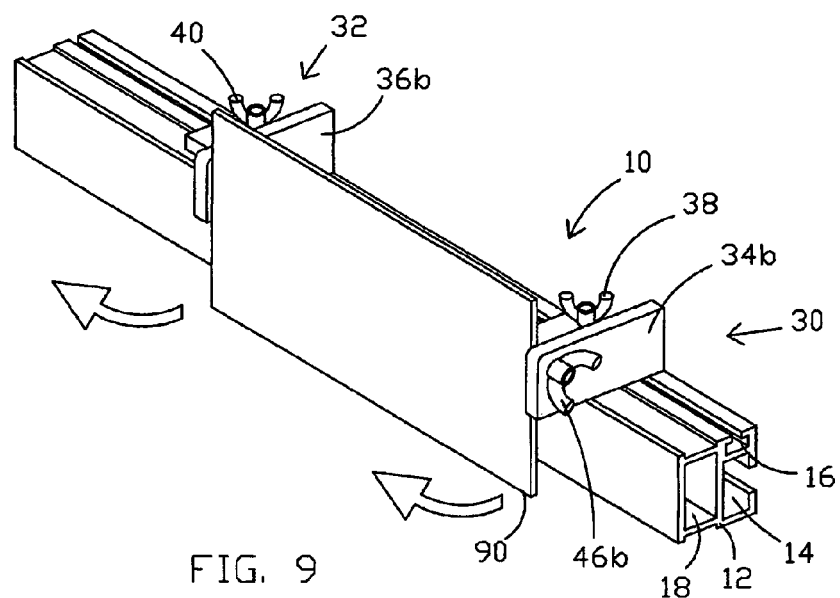
FIG. 9 is a perspective view of an exemplary guide made in accordance with the present invention, and including a means for mounting a working piece in a non-horizontal orientation.

As a further refinement, and referring now to FIG. 9, the guide 10 of the present invention can also be used to mount and retain a working piece 90 in a non-horizontal orientation, for example, to cut through the working piece at a predetermined angle. In this regard, the working piece 90 is secured between the respective second base portions 34b, 36b of the arm assemblies 30, 32. Accordingly, there is no need for the additional arm segments 42, 44, 52, 54.

Figure 10:
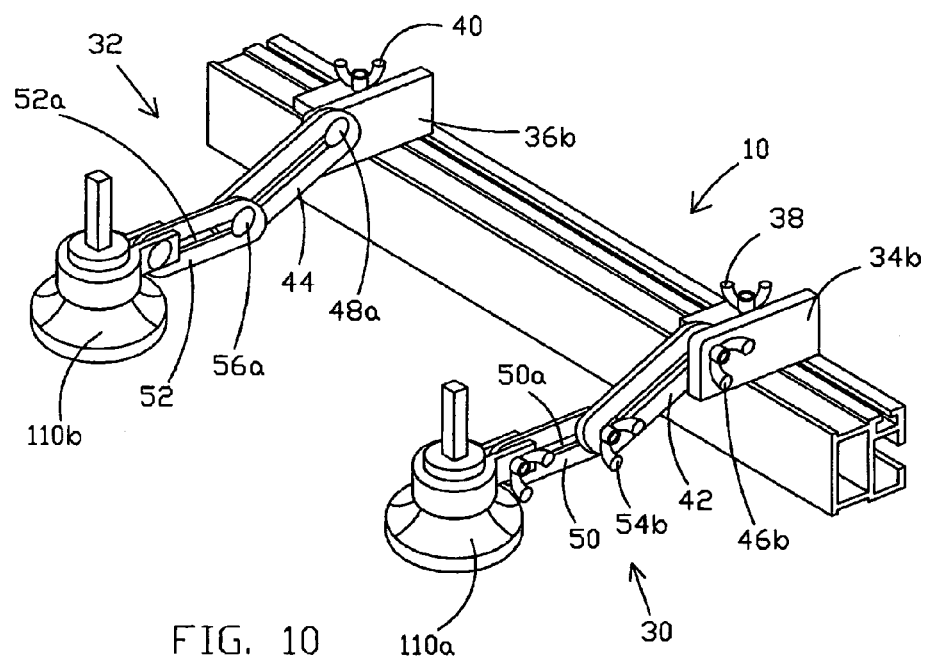
FIG. 10 is a perspective view of an exemplary guide made in accordance with the present invention, and including a means for grasping and securing a non-porous material for cutting.

Finally, as yet a further refinement, and referring to FIG. 10, a pair of suction cups 110a, 110b or similar means could be secured near the distal ends of the second arm segments 50, 52 of the articulating arm assemblies 30, 32, allowing the guide 10 to retain and secure a non-porous material, such as glass, plastic, or metal, for cutting.

One of ordinary skill in the art will also recognize that additional embodiments are possible without departing from the teachings of the present invention or the scope of the claims which follow. This detailed description, and particularly the specific details of the exemplary embodiments disclosed therein, is given primarily for clarity of understanding, and no unnecessary limitations are to be understood therefrom, for modifications will become obvious to those skilled in the art upon reading this disclosure and may be made without departing from the spirit or scope of the claimed invention

What is claimed is:

1. A guide for a cutting tool, comprising:
   one or more brackets for securing the guide to the cutting tool;
   a horizontal support member having a first channel and being secured to and moveable with respect to said brackets; and
   a plurality of arm assemblies adjustably secured to the horizontal support member and adapted to secure a working piece relative to the horizontal support member;
   wherein the horizontal support member and secured working piece can be advanced over a cutting blade of the cutting tool by moving the horizontal support member relative to the brackets; and
   wherein each of said brackets includes wheel bearings received in said first channel so as to facilitate the movement of the horizontal support member relative to the brackets.

2. The guide for a cutting tool as recited in claim 1, in which the wheel bearings are positioned so as to engage wall surfaces of the first channel.

3. The guide for a cutting tool as recited in claim 1, in which each bracket has a first portion and a second portion that is adjustably secured to the first portion, thus creating a clamp that can be secured to the cutting tool.

4. The guide for a cutting tool as recited in claim 3, in which the first portion of each bracket is secured to the second portion of each bracket by a fastener that passes through a hole defined by the second bracket portion and into a corresponding threaded hole defined by the first bracket portion.

5. The guide for a cutting tool as recited in claim 1, in which each arm assembly includes at least two arm segments that can be pivoted and adjusted to secure the working piece relative to the horizontal support member.

6. The guide for a cutting tool as recited in claim 1, in which each arm assembly includes:
   a base portion secured to the horizontal support member at a predetermined location along the length of the horizontal support member;
   a first arm segment secured to and extending from the base portion; and
   a second arm segment secured to and extending from the first arm segment.

7. The guide for a cutting tool as recited in claim 6, in which the base portion of each arm assembly comprises a first base portion that is received in a channel defined by the horizontal support member and a second base portion that rests on the upper surface of the horizontal support member, said first and second base portions being secured together by a fastener passing through the respective base portions.

8. The guide for a cutting tool as recited in claim 6, in which the first arm segment defines an elongated opening, such that the first arm segment can be secured to the base portion at a selected location along the length of the first arm segment by passing a fastener through the elongated opening and the base portion.

9. The guide for a cutting tool as recited in claim 8, in which the second arm segment also defines an elongated opening, such that the second arm segment can be secured to the first arm segment at a second selected location along the length of the first arm segment by passing a fastener through the respective elongated openings of the first and second arm segments.

10. The guide for a cutting tool as recited in claim 6, wherein the working piece can be secured between the respective second arm segments of two of the plurality of arm assemblies.

11. The guide for a cutting tool as recited in claim 1, and further comprising one or more suction cups near a distal end of each arm assembly for retaining and securing a non-porous material for cutting.

12. A guide for a cutting tool, comprising:
   one or more brackets for securing the guide to the cutting tool;
   a horizontal support member secured to and moveable with respect to said brackets; and
   a pair of articulating arm assemblies secured to the horizontal support member and adapted to secure a working piece relative to the horizontal support member;
   wherein the horizontal support member and secured working piece can be advanced over a cutting blade of the cutting tool by moving the horizontal support member relative to the brackets; and
   wherein each articulating arm assembly includes a base portion secured to the horizontal support member and a first arm segment that defines an elongated opening extending along a longitudinal direction of the first arm segment such that the first arm segment can be secured to the base portion of the respective arm assembly at a selected location along the length of the first arm segment by passing a fastener through the elongated opening and the base portion.

13. The guide for a cutting tool as recited in claim 12, in which each articulating arm assembly further includes:
   a second arm segment secured to and extending from the first arm segment.

14. The guide for a cutting tool as recited in claim 13, in which the second arm segment also defines an elongated opening extending in a longitudinal direction of the second arm segment, such that the second arm segment can be secured to the first arm segment at a second selected location along the length of the first arm segment by passing a fastener through the respective openings of the first and second arm segments.

15. The guide for a cutting tool as recited in claim 13, wherein the working piece can be secured between the respective second arm segments of the two articulating arm assemblies.

16. The guide for a cutting tool as recited in claim 12, in which the base portion of each articulating arm assembly comprises a first base portion that is received in a channel defined by the horizontal support member and a second base portion that rests on the upper surface of the horizontal support member, said first and second base portions being secured together by a fastener passing through the respective base portions.

* * * * *